Aug. 8, 1950
H. C. HAYES
2,517,565
ELECTRODYNAMIC TRANSCEIVER FOR TRANSMISSION
AND RECEPTION OF SOUND
Filed Jan. 21, 1939
3 Sheets-Sheet 1
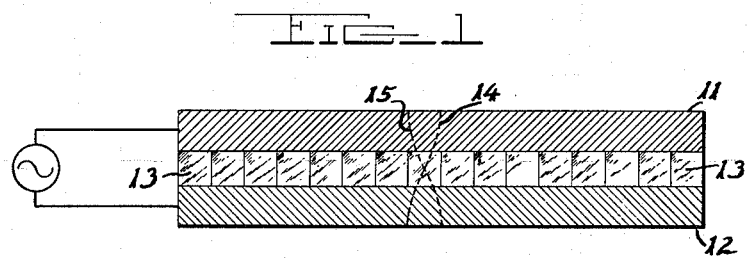
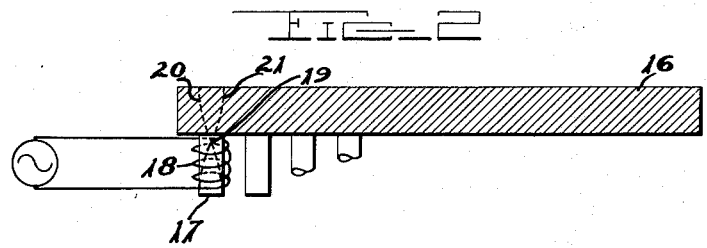
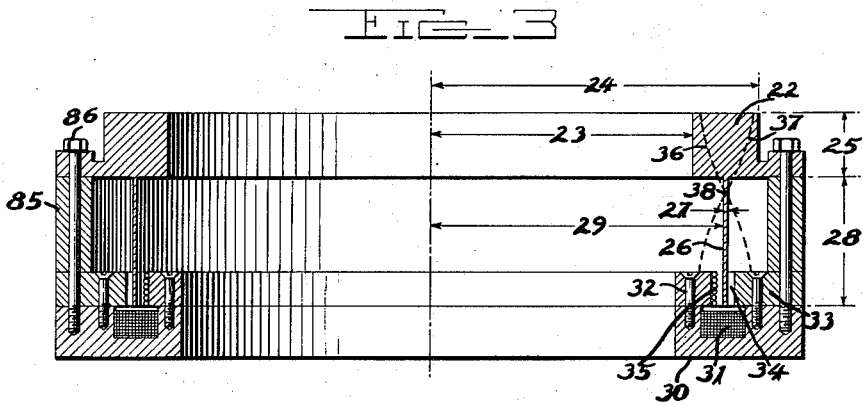
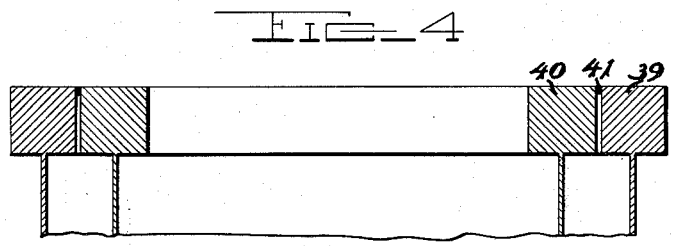
INVENTOR
Harvey C. Hayes
BY
Ransom K. Davis
ATTORNEY

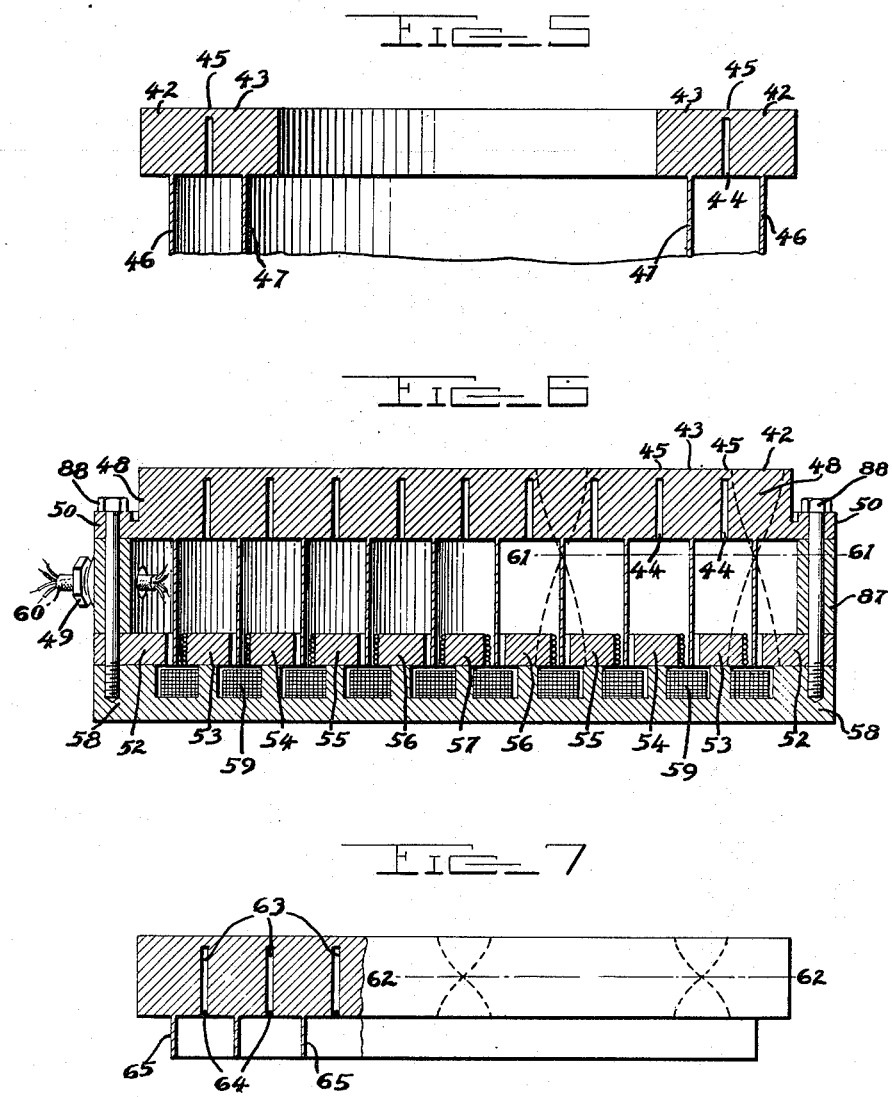

Aug. 8, 1950  H. C. HAYES  2,517,565
ELECTRODYNAMIC TRANSCEIVER FOR TRANSMISSION
AND RECEPTION OF SOUND
Filed Jan. 21, 1939  3 Sheets-Sheet 3
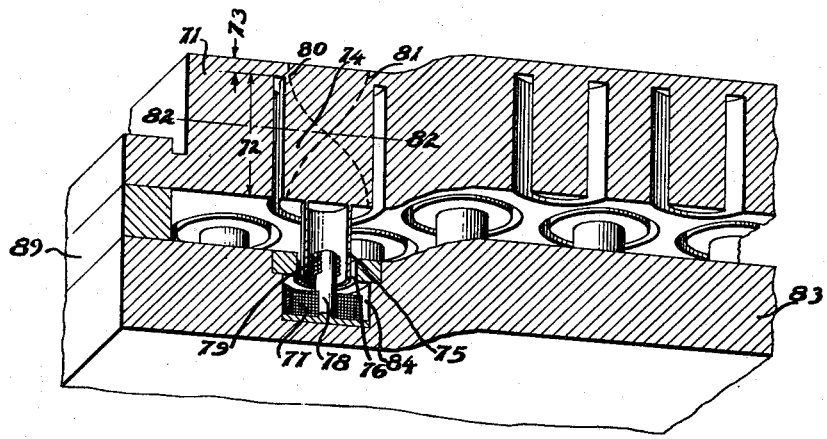
INVENTOR
*Harvey C. Hayes*
BY
*Ransom N. Davis*
ATTORNEY Patented Aug. 8, 1950

2,517,565

UNITED STATES PATENT OFFICE 2,517,565

ELECTRODYNAMIC TRANSCEIVER FOR TRANSMISSION AND RECEPTION OF SOUND

Harvey C. Hayes, Washington, D. C.

Application January 21, 1939, Serial No. 252,104

1 Claim. (Cl. 177—386)

(Granted under the act of March 3, 1883, as amended April 30, 1928; 370 O. G. 757.)

This invention relates broadly to improvements in apparatus for interconverting electrical energy and sound energy. More particularly, it relates to improvements in a system for directively transmitting and receiving underwater sounds.

An object of this invention is to provide a directive electrodynamic transceiver useful for both transmission and reception of sound.

Another object of this invention is to provide a directive electrodynamic transceiver especially useful for supersonic electroacoustic energy conversions.

Another object of this invention is to provide a directive electrodynamic transceiver capable of generating more sound energy than previous directive transceivers.

Another object of this invention is to provide a directive electrodynamic transceiver capable of manufacture by a method which facilitates the desirable condition of uniformity of phase and amplitude for increments of the radiating surface.

This invention will be described in connection with the following drawings, in which:

Fig. 1, partly in section, shows the elements of a quartz-steel transceiver, with node and loops of vibration indicated.

Fig. 2, also partly in section, shows the elements of a magnetostriction transceiver, with node and loops of vibration indicated.

Fig. 3 is a mid-sectional view of one form of my directive electrodynamic transceiver but with only one element of the oscillatory member and one electrodynamic unit shown, indicating the principle of operation.

Fig. 4 shows one method of coupling the elements of the oscillating member of Fig. 3.

Fig. 5 is a mid-sectional view of an oscillating member for one type of my directive electrodynamic transceiver with the oscillating member manufactured in one piece.

Fig. 6 is a mid-sectional view of one form of my directive electrodynamic transceiver, showing all essential parts, so dimensioned that the nodal plane falls within the narrow bands and outside of the solid metal of the oscillating diaphragm.

Fig. 7 shows one form of the oscillating member of my directive electrodynamic transceiver so dimensioned that the nodal plane falls within the solid metal of the oscillating diaphragm.

Fig. 8 is a representation of the oscillating member of Fig. 6 in a simple spring-mass system.

Fig. 9 is a representation of the oscillating member of Fig. 7 in a simple spring-mass system.

Fig. 10 is an isometric sectional view of another form of my electrodynamic transceiver, showing a type of construction adaptable to almost any shape of face for the oscillating member.

The generation and reception of directive sound signals, particularly underwater sound signals, is best accomplished by providing an active plane face area of dimensions large with respect to the wave length of the sound generated. If this area is circular and all elements of the face area operate in phase, the angle $\theta$ which the cone-shaped beam makes with its axis, is given by the equation $$\sin \theta = 0.62 \frac{\lambda}{D}$$

where $\lambda$ is the wave length and $D$ is the diameter of the circular face. If the nature of the device is such that the active face is made to oscillate perpendicularly to its surface by the application of electrical or magnetic forces and thereby transmit sound into the surrounding medium, and, in turn, if the impingement of sound waves against this face sets up mechanical oscillations which in turn generate electrical energy at the expense of the sound energy meeting the face, then the device serves for both transmitting and receiving sound signals. Such a device is termed a transceiver. My invention is such a device and thus may be defined as a directive electrodynamic transceiver.

The nature and extent of the improvements embodied in my invention can best be understood by first considering the principle of operation and inherent weaknesses of other types of transceivers.

Fig. 1 shows the principle of operation of the so-called quartz-steel transceiver wherein numerals 11 and 12 indicate two like circular plates, usually made of steel, and 13 indicates a mozaic of quartz crystals to which both plates are cemented. The X-axis of the crystals is directed perpendicular to the plane surfaces of the plates. An alternating voltage across the plates causes the crystals to expand and contract because of their piezo-electrical properties, and at some definite frequency the combination is set into resonant oscillation as shown by the dotted lines 14 and 15. The outside surface of each plate becomes a loop and the mid-plane of the crystals an intervening node in this half-wave mode of oscillation.

This system has three inherent weaknesses: First, as the system oscillates the material adjacent to the nodal plane undergoes axially directed pressure changes in a radial direction in accordance with Poisson's ratio for the material of the plate. This reaction produces a system of compressional waves in a radial direction which combine with the axial wave system to prevent the radiating surface from oscillating at equal amplitude and in phase as demanded of a directive transceiver. Second, the mechanical work per cycle which the crystals can accomplish depends on the force with which they expand to push the plates apart and then contract to pull them together and the distance through which these forces act. Calling the average force F, the amplitude of expansion or contraction S, and the number of cycles per second N, then the mechanical power P (the work per second) becomes $$P = F \times S \times N$$

If there were no internal losses this power would be radiated into the medium as sound. In practice, this power cannot be made very large because of the extreme minuteness of the factor S which represents the amplitude through which the crystals expand and contract in the direction of their X-axis. But only a fraction of this power finally radiates as sound because there are relatively large internal losses, the main source of which is the work done by the motion of the crystals along their Y-axis. This motion is in a radial direction and works against the viscous cement to generate heat. This not only reduces the acoustical efficiency but tends to limit the amount of power that can be supplied because of the danger of overheating and weakening the cement.

Third, the large internal losses prevent the tuning of the transceiver to sharp mechanical resonance. This reduces its selectivity against the strong, local disturbing noises generated by propellers, auxiliaries and water turbulence, and gives a strong background of noise against which the signal must be detected. The range of operation is thereby reduced.

Fig. 2 shows the principle of operation of the magnetostriction transceiver wherein numeral 16 indicates a plate, usually circular in form, to which a multiplicity of tubes 17 are attached at uniform spacing over one layer. Each of these tubes forms the core of a magnetizing coil 18. These several coils are connected in parallel or series or series-parallel to give a desired electrical impedance. Each coil carries a series direct current and a superimposed alternating current. Thus, the tubes undergo a periodic change of magnetic flux of the frequency of the alternating current, and at some definite frequency will resonate mechanically in accordance with the dotted lines 20 and 21, the oscillating mechanical energy being supplied through the magnetostrictive properties of the material of the several tubes.

In the magnetostriction oscillator the mechanical work performed by the several tubes results from the fluctuating strains set up by the fluctuating magnetic field to which they are exposed. It can be shown both theoretically and experimentally that the major portion of this work is done by the portions of the tubes that are adjacent to the node of mechanical oscillation 19, as it can also be shown that nothing is gained by using tubes of wall thickness greater than a few thousandths of an inch, because at the supersonic frequencies the magnetic field does not penetrate to a greater depth. This results from the so-called "skin effect." Thus, the amount of magnetostrictive material per tube that can be actively worked is confined to a short length adjacent to the node and to a wall thickness of but a few thousandths of an inch. Moreover, the number of tubes that can be used is limited because of the space about each tube that is required for the magnetizing coil. In practice each tube requires an area of about a half inch square on the supporting plate. Thus the amount of magnetostrictive material that can be actively employed to energize a transceiver is considerably less than the amount of quartz crystal material that can be so employed. The mechanical power that can be developed by the magnetostrictive material of a transceiver is probably somewhat in excess of that supplied by the quartz, but it is distinctly limited, because the amount of material that can be employed is small, and also for the reason that the amplitude of expansion and contraction of these materials is, like the quartz, very small. Here, as in the quartz-steel transceiver the mechanical power is given by $$P = F \times S \times N$$

where the power P is distinctly limited by the minuteness of the amplitude S through which the driving force F operates, and this force F is also limited because of the small amount of magnetostrictive material that can be actively employed.

Since the magnetostriction transceiver has less internal losses than does the quartz-steel because it is free from motion corresponding to the Y-axis motion of the crystal, it is thus relatively free from the radial standing wave system and its tendency to destroy uniformity of phase and amplitude over the radiating surface. This is because the nodal plane falls within the tube lengths outside of the solid metal of the plate when the radial pressure changes are small and unresisted and where there is no coupling in a radial direction between adjacent tubes. However, these advantages are to a large extent offset by the difficulty, if not impossibility, of tuning the magnetostriction tubes to the same frequency, and also to the fact that the tubes cannot be spaced over a circular area so that each supports the same mass of the plate. As a result this type of transceiver usually is not as sharply tuned as is the quartz-steel type. It therefore carries a stronger background of noise against which the echoes or other desired signals must be detected.

Summing up, we find the two types of oscillators described have much in common. They both operate through a change in dimension of an activating element brought about by changes of a superimposed field of force. In the case of the crystals an electric field is employed, while in the case of the magnetostriction elements a magnetic field is employed. In both cases the oscillating forces are generated within the oscillating system itself and, as a result, they must operate primarily in the material at and adjacent to the nodal plane because this is where the material suffers the greatest strain. It follows that the amplitude through which these forces operate must be very small. If these same forces could be made to operate through the amplitude swept out by the outside faces, in the case of the quartz-steel transceiver, or, through the amplitude of movement of the free end of the tubes, in the case of the magnetostriction transceiver, they could do many times more mechanical work because of the increase of the factor S in the preceding power equation, and hence could generate more sound energy. If this could be done, a gain factor somewhere between 100 and 1000 should be expected in the case of the magnetostriction transceiver, depending upon the material of the tubes.

It can be shown that to drive a half-wave oscillating system by forces applied at a loop, these forces must be coupled to an outside and relatively stationary member. In such a system, the factors of the power formula $P = F \times S \times N$ differ from those of the crystal and magnetostrictive types in that the factor S, the distance through which the force operates, is relatively much greater. If the factor F, the driving force, can be made to approach that of the transceivers described, my new device should generate a much stronger sound signal.

In Fig. 3 numeral 22 indicates a ring of inside radius 23, outside radius 24, and thickness 25 in the direction of the axis of revolution. Numeral 26 indicates a thin band of radial thickness 27, axial length 28, and average radius 29, which centers on and is rigidly attached to ring 22. The radius 29 is evaluated substantially in accordance with the relation $$r_x = \tfrac{2}{3}\left(\frac{r_2^3 - r_1^3}{r_2^2 - r_1^2}\right)$$

where $r_x$ is numeral 29 (Fig. 3)
$r_1$ is numeral 23 (Fig. 3)
$r_2$ is numeral 24 (Fig. 3), which centers the band 26 over the locus of the radial center of percussion of ring 22. Numeral 30 indicates the body of a ring-shaped electromagnet in which a direct current coil 31 is imbedded. The rings 32 and 33 form the poles of the electromagnet between which is a ring gap 34 of uniform radial width across which there is a strong magnetic field directed outwardly or inwardly in accordance with the direction of the direct current in coil 31. An alternating current coil 35 of one or more layers is wound in fixed anchored position on the pole face of ring 32. The band 26 is held centered in the magnetic gap at a depth substantially equal to that of the gap.

Electrically speaking, the gap-enclosed portion of band 26 is tightly coupled to the alternating current coil 35, and, since the resistance of band 26 is very low, it will at any and every instant carry practically the same ampere turns as does coil 35. The reaction of this induced current in the band 26 with the radial direct current field produced by coil 31 produces alternating mechanical forces directed along the elements of band 26, of frequency equal to that of the alternating current, in accordance with the well-known electrodynamic principle of generating oscillating mechanical forces. At some proper frequency of the alternating current the combination of ring 22 and band 26 is caused to resonate mechanically in accordance with the dotted lines 36 and 37 with a node at some point 38, which preferably should fall within the band 26, but which may be made to fall within the ring 22, depending on the relative lengths 25 and 28. It is to be noted that the oscillating forces F are applied at a loop where the amplitude of motion is greatest, instead of at the node where it is relatively much smaller. An annular distance piece 85 separates ring 22 from electromagnet pole body 33. A plurality of stud bolts 86 secure the assembly together.

The outer plane surface of ring 22 of Fig. 3 represents one increment of the total radiating area of such a transceiver. The whole circular area is made up of a number of these increments fitted concentrically within one another so as to present a complete circular radiating area of any desired diameter.

Thus, the generated forces are used to produce a standing wave system in the oscillating system or member, i. e., combined rings 22 and 26 (Fig. 3), with dimensioning in accordance to the equation $$r_x = \tfrac{2}{3}\left(\frac{r_2^3 - r_1^3}{r_2^2 - r_1^2}\right)$$

explained above, whereby all portions of the outer or radiating faces of rings 22 oscillate with uniform amplitude and phase. It extends the use of such forces to the efficient generation of sound of super-audible frequency and for oscillating a radiating plane surface of almost any desired area at uniform amplitude and phase at these high frequencies. In short, it makes possible the use of such forces for generating directive high-pitched sound signals such as are radiated from a plane circular area that oscillates with uniformity of amplitude and phase and has dimensions large with respect to the wave length of the signals. The equation $$\sin \theta = 0.62 \frac{\lambda}{D}$$

explained above, applies to such a sound generator.

It is obvious that each and all of these ring increments must be designed to have the same mechanical frequency. This condition is met when the ratio of the mass of the ring 22 to the band 26 is made the same for all the increments. This can be accomplished by various dimensioning schemes. It is preferred, however, to make the thickness 27 equal for all the bands 26, and then dimension each associated ring 22 to give the correct mass ratio. Aside from the advantage of simplicity of computation and design of the oscillating members, this scheme calls for equal air gaps in the several ring magnets, which, in turn, simplifies the design of these magnets to meet the desirable condition of equal intensity of magnetic field across the air gap of all the increments.

As stated, it is desirable that all portions of the radiating area should oscillate with the same amplitude. This will result if the driving force per unit area for each ring increment of radiating surface is the same. These forces can most readily be made equal by making the flux density across all the gaps equal and providing for the same ampere turns through all the alternating current coils. Then the induced current in all the gap-enclosed bands will be equal and the driving force per unit length of band will be the same for all.

To secure uniformity of phase between the several ring increments it becomes desirable and probably necessary to effect some sort of coupling between adjacent rings. Such coupling may be accomplished by brazing or welding adjacent rings across the line of contact—preferably on the radiating surface as shown by Fig. 4, wherein two adjacent rings 39 and 40 are shown welded at 41. It is obvious that these two rings can be made integral as shown in Fig. 5 where two rings 42 and 43 are shown made in one piece and are separated by a narrow machined slot 44. The coupling at 45 (Fig. 5) is a short bridge of solid material.

In practice, it is preferred to make the whole oscillating system of one solid piece of metal and the several magnets corresponding to the several increments are also preferably turned from a single heavy disc of magnetic material of high permeability. Fig. 6 shows such a manner of construction, and is one form of my transceiver complete, composed of several concentric units, one of which is described under Fig. 3. The entire oscillating member 48 is machined from the same piece of metal, as in Fig. 5. The magnetic pole pieces 52, 53, 54, 55 and 56 are all circular rings, while the central pole piece 57, is cylindrical in shape. The body 58 of the magnets is made of a single piece of metal and is machined to receive direct current coils 59. 61—61 is the nodal plane of the oscillating system or member. The oscillating member is anchored in proper relation to the magnets by flange 50 which is also designed to protect the coil system, the leads from which emerge by cable 60 through stuffing box 49. Such leads, a showing of which has been omitted from the drawing for the sake of clearness, may pass from the coils into the clearance between the lower edges of the bands and the tops of the field coils 59 and thence to the cable through suitable passageways in the members 58 and 52. Obviously, other methods of anchoring the oscillator to the magnet can be employed. Annular distance piece 87 separates oscillating member 48 from pole body 52. A plurality of stud bolts 88 secure the assembly together.

Difficulties and weaknesses caused by any design that places a nodal plane in the solid disc portion of the oscillating system have previously been discussed. Such a design prevents the radiating face from oscillating with uniformity of amplitude and phase. If the dimensioning of the oscillating member of Fig. 6 is such that the nodal plane of the standing wave system falls within the solid metal coupling bridges 45, there is no need for the slots 44, and the coupling between adjacent increments is improved by omitting the slots 44 entirely.

Fig. 7 shows another design for the oscillating member that has certain advantages. There the nodal plane 62—62 falls within the solid metal the same as it does in the case of the quartz-steel transceiver. In this design the slots are required to prevent the formation of the radial standing wave system with its ill effects. The entrances of these slots can be closed by welding as indicated by numeral 64 to improve the coupling between adjacent rings and to give greater assurance of uniformity of phase over the radiating surface. It is to be noted that the bands 65 are only of sufficient length to penetrate the magnetic gap for driving or coupling purposes. Thus, they play only a minor role in determining the resonant frequency of the oscillating system because their mass is small in comparison with that of the rest of the metal that is on their side of the nodal plane 62—62. This offers considerable advantage from the standpoint of construction as can be understood in connection with Figs. 8 and 9, which represent in a simple spring-mass system the two designs shown in Figs. 6 and 7, respectively.

In Fig. 8, 66 represents the mass of the oscillating member above the nodal plane 61—61 of Fig. 6, and 67 represents the mass of the oscillating member below that plane, these two masses joined together by a flexible member 68. In Fig. 9, 69 represents the mass of the oscillating member of Fig. 7 above the nodal plane 62—62 and 70 the mass of the oscillating member below this plane, these masses 69 and 70 joined by a flexible member 71. In Fig. 8, the mass below the nodal plane is very much smaller than that above; while, in Fig. 9, the masses above and below the nodal plane are about the same size. The point to note is that a small variation in the absolute value of mass 67 in Fig. 8 is a large percentage error and, as a result, will cause a relatively large change in the resonant frequency; while the same variation in the absolute value of mass 70 of Fig. 9 will represent only a small percentage error and, as a result, will cause only a relatively slight change in the resonant frequency. The accuracy of machining required to make all the ring increments of the same resonant frequency is much greater in the case of the design of Fig. 6 than is required in the case of the design of Fig. 7. Thus, the design of Fig. 7 lends itself more readily to securing uniform amplitude and phase across the radiating area, and from that standpoint, is my preferred form. However, both forms are important. From the standpoint of efficiency, that of Fig. 6 is the preferred form.

Fig. 10 shows another type of my directive electrodynamic transceiver that has proved effective and which lends itself particularly well to the slotted or vented head type of transceiver. Numeral 71 indicates a vented head which is manufactured by boring with a hollow mill into a solid block to a depth 72 leaving a solid plate of whatever thickness 73 may be desired, with cylindrical extensions 74 uniformly spaced over this plate. Each of these cylindrical extensions 74 terminates in a thin band 75, which centers in a ring-shaped gap 76 carrying a radial magnetic field generated by direct current coil 77. The inner pole 78 of each magnetic gap 76 carries an alternating current coil 79. Upon passing alternating current of proper frequency through these alternating current coils 79, push-pull forces are generated in the bands 75. All the cylinders will oscillate at mechanical resonance in a standing wave system represented by the dotted lines 80 and 81 with the nodal plane at 82—82. Coupling between adjacent cylinders is provided by the solid metal of thickness 73 adjacent to the radiating face. The direct current radial field magnets are preferably all made from a plate 83 by boring holes 84 of proper dimensions and spacing into the plate. Each hole is provided with a magnetic core or pole 78 upon which the direct current coil 77 and alternating current coil 79 are wound. Distance piece 89 separates oscillating member 71 from pole body 83. This scheme permits the use of the electrodynamic principle for driving radiating surfaces of almost any shape while the other designs lend themselves only to a circular surface. The design of Fig. 10 also offers an advantage by making it possible to connect the coils of the several increments in series, parallel, or series-parallel to provide a practical value of impedance.

In summation, the principle of the electromagnetic drive to oscillate a diaphragm for generating sound or of transforming sound energy striking a diaphragm into electrical energy is old. These uses have only been applied to the transmission and reception of low pitched sound of wave lengths long with respect to the dimensions of the diaphragm or radiating area. Thus, both transmission and reception were substantially non-directive. Such devices could not be used to generate or receive high pitched sounds because the restoring forces of a diaphragm, which are flexural, are not great enough to cause the massive diaphragm to resonate at high frequencies. A radiating surface can be made to oscillate at the higher frequencies if it forms the loop of a standing wave system in an element where the restoring forces are longitudinal; i. e., where the restoring forces are the result of longitudinal strains, because in this case the ratio of the restoring force to the mass is great. My invention employs electrodynamic forces to set up and maintain such oscillations.

The radial dimension of the radiating area that can be driven in phase by a single band 26 (Fig. 3) should not exceed about one-fourth of the length of the sound wave in the metal, and preferably should be kept smaller. For this reason the radial width of the rings 22 (Fig. 3), or the diameter of the cylinders 74 (Fig. 10) must be small with respect to the wave length to which the system resonates. This, of course, does not give a single increment sufficient area to make the sound directive. Large areas can be built up of the small increments, but to secure uniformity of phase these several increments must be coupled. Such directive radiating areas have been built up of increments driven by both crystal and magnetostrictive elements with considerable success and these combinations have been patented. But, as shown, the acoustical power of these devices is limited and the condition for uniformity of phase has not been well met because of the difficulty of keeping the ratio of the effective masses of the numerous increments above and below the nodal plane, equal. In my directive electrodynamic transceivers described herein these ratios are kept extremely accurate because the whole oscillating member is machined at one setting of the lathe, or other machine, such method not only affording mechanical accuracy but also low cost.

It will be understood that the above description and accompanying drawings comprehend only the general and preferred embodiment of my invention and that various changes in construction, proportion and arrangement of parts may be made within the scope of the appended claims without sacrificing any of the advantages of my invention.

The invention described herein may be manufactured and/or used by or for the Government of the United States of America for governmental purposes without the payment of any royalties thereon or therefor.

I claim:

An electrodynamic electro-acoustic transducer comprising a diaphragm with a plurality of non-concentric non-overlapping circular slots of the same diameter uniformly disposed over one plane face thereof, a thin cylindrical band perpendicularly extending from the solid cylindrical section of said diaphragm enclosed by each said circular slot, each said band substantially centered over the locus of the center of percussion of the portion of said diaphragm to which attached, said diaphragm and said bands comprising an oscillating member, a plate with a plurality of cylindrical recesses uniformly disposed over one plane face thereof comprising an electromagnet pole body, a central cylindrical pole piece, an annular outer pole piece, a direct current coil and an alternating current coil disposed in each cylindrical recess forming a plurality of electromagnets, an annular distance piece separating said oscillating member from said plate, such that the free ends of said cylindrical bands are centered in the air gaps of said electromagnets substantially midway between said pole pieces, said electromagnets and said cylindrical bands comprising an electrodynamic electroacoustic energy inter-conversion means, said oscillating member setting up a standing wave system of longitudinal type with a loop in an element of said oscillating member where the restoring forces are longitudinal, the parts of said oscillating member and said coils being so located and related that the energy transfer from the coils to the bands occurs at a loop of said standing wave system, all elements of the radiating surface of said oscillating member oscillating with substantial uniformity of amplitude and phase.

HARVEY C. HAYES.

REFERENCES CITED

The following references are of record in the file of this patent:

UNITED STATES PATENTS

| Number | Name | Date |
| --- | --- | --- |
| 1,582,590 | Fay | Apr. 27, 1926 |
| 1,604,532 | Reigger | Oct. 26, 1926 |
| 1,690,579 | Hammond | Nov. 6, 1928 |
| 1,980,957 | Parry | Nov. 13, 1934 |
| 2,007,746 | Ringel | July 9, 1935 |
| 2,063,950 | Steinberger | Dec. 15, 1936 |
| 2,088,324 | John | July 27, 1937 |
| 2,402,697 | Turner | June 25, 1946 |
| 2,405,472 | Turner | Aug. 6, 1946 |
| 2,419,608 | Turner | Apr. 29, 1947 |
| 2,444,967 | Turner | July 13, 1948 |

FOREIGN PATENTS

| Number | Country | Date |
| --- | --- | --- |
| 178,235 | Great Britain | Apr. 20, 1922 |
| 298,382 | Great Britain | Oct. 11, 1928 |